United States Patent [19]

Canup et al.

[11] 4,022,177
[45] May 10, 1977

[54] CONTROLLED SPARK DURATION IGNITION SYSTEM

[75] Inventors: Robert E. Canup, Chester, Va.; Clifford H. Faist, Monsey, N.Y.

[73] Assignee: Texaco Inc., New York, N.Y.

[22] Filed: Apr. 23, 1975

[21] Appl. No.: 570,676

[52] U.S. Cl. .................... 123/148 CB; 123/117 R
[51] Int. Cl.² .......................................... F02P 1/00
[58] Field of Search ... 123/148 E, 148 CB, 148 CC, 123/117 R, 146.5 A

[56] References Cited

UNITED STATES PATENTS

| | | | |
|---|---|---|---|
| 3,556,064 | 1/1971 | Date | 123/117 R |
| 3,626,455 | 12/1971 | Toda | 123/117 R |
| 3,792,261 | 2/1974 | Canup et al. | 123/148 E |
| 3,818,885 | 6/1974 | Canup | 123/148 E |
| 3,861,369 | 1/1975 | Canup | 123/148 E |
| 3,874,349 | 4/1975 | Fitzner | 123/148 E |
| 3,874,350 | 4/1975 | Shiraishi | 123/117 R |
| 3,896,913 | 7/1975 | Maruoka | 123/117 R |
| 3,910,246 | 10/1975 | Canup | 123/148 E |
| 3,913,550 | 10/1975 | Canup | 123/148 E |

Primary Examiner—C. J. Husar
Assistant Examiner—Paul Devinsky
Attorney, Agent, or Firm—Thomas H. Whaley; Carl G. Ries; Henry C. Dearborn

[57] ABSTRACT

An ignition system for an internal combustion engine. The system is a type that employs a continuous-wave oscillator which includes a transformer with a high voltage output winding to supply the sparking circuit via a distributor. And, the transformer has an oscillator control winding for starting and stopping oscillation. There is an electronic switch to control application of a DC bias current to the control winding when the oscillator is not oscillating. And, the improvement concerns using plural crank angle controlled sensors with electronic circuit means to select a desired one of the sensors to provide the crank angle degree ignition timing desired.

4 Claims, 3 Drawing Figures

CONTROLLED SPARK DURATION IGNITION SYSTEM

BACKGROUND OF THE INVENTION

1. Field of the Invention

This invention concerns ignition systems in general, and more specifically relates to an improved ignition system for use with internal combustion engines. It is especially concerned with a controlled-spark-duration ignition system that employs a continuous-wave oscillator.

2. Description of the Prior Art

This invention deals particularly with ignition systems of a type like that set forth in the following three U.S. patents, i.e. U.S. Pat. No. 3,818,885 which discloses the same basic type of ignition system; and U.S. Pat. No. 3,792,261 which discloses a photo electric distributor of a type which may be used with this invention; and U.S. Pat. No. 3,861,369 which discloses an ignition system and particularly an electronic control circuit that is for use with this type of ignition system. Especially in connection with some types of internal combustion engines it has been found beneficial to provide for double ignition timing controls with a different basic time setting for each. These are provided so that under certain conditions a complete shift of the ignition timing base may be made in order to change from a given spark timing condition, e.g. top dead center, to a given angle of a retard or other substantial basic change in the ignition timing.

While the basic concept of providing such a dual ignition timing system is quite well known, all the known proposals for thus providing two systems which may be selectively employed, only have been disclosed with systems that use conventional "points" for the ignition timing controls. Consequently, they dealt with one shot types of ignition signal and such do not involve controlled duration sparks, but rather mere controlled initial timing of spark signals.

Furthermore, with the prior systems, when spark timing control is shifted from one of the two sets of "points" to the other at the instant when a spark is called for, a spark could be missed.

Consequently, it is an object of this invention to provide for an ignition system related to a controlled duration continuous-wave spark signal, which has dual spark timing elements on the distributor so that the ignition timing may be shifted from one basic timing control to another under desired conditions.

SUMMARY OF THE INVENTION

Briefly, the invention concerns an improvement that is in combination with a controlled-spark-duration ignition system for an internal combustion engine. The said system has a high freqeuncy continuous-wave oscillator including a transformer having a high voltage output winding adapted for connection to a sparking circuit, and an oscillator control winding on said transformer for starting and stopping oscillation. It also has electronic switch means for controlling application of a DC bias current to said control winding when said oscillator is not oscillating. The improvement that is with the foregoing combination, comprises plural means controlled by said engine crank angle for actuating said electronic switch means to control said spark duration intervals. It comprises electronic circuit means for selecting one of said crank-angle controlled means in order to provide a predetermined ignition timing selectively.

Once more briefly, the invention concerns an improvement that is in combination with a controlled spark duration ignition system for an internal combustion engine. The said system has a high frequency continuous-wave oscillator including a transformer that has high voltage output winding adapted for connection to a sparking circuit. It also comprises an oscillator control winding on said transformer for starting and stopping oscillation, and electronic switch means that comprises a transistor connected in series with said oscillator control winding. And, it comprises trigger means for switching said transistor from conducting to non-conducting state and back. The improvement with the foregoing combination comprises a pair of photoelectric sensors mounted diametrically apart on the distributor of said engine and having different ignition timing angles relative to said engine crank shaft. The improvement also comprises a pair of electronic gates, and an engine load condition switch actuated by the accelerator of said engine. It also comprises an electronic flip-flop for controlling which of said gates is open, and said sensors are each connected to one of said gates. It also comprises means for connecting the output of said gates to said trigger means, and a clocking pulse circuit from said trigger means to said flip-flop for flipping said flip-flop to its opposite state upon the return of said transistor to said conducting state if said engine load condition switch has been shifted from one position to the other.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DESCRIPTION OF THE PREFERRED EMBODIMENT

As indicated above, this invention concerns a particular type of ignition system and such type system may be basically described as a controlled spark duration system. This means that there is a continuing spark signal generated over a predetermined number of crank angle degrees. Such an ignition system is described in U.S. Pat. No. 3,818,885 which is assigned to the same assignee as the subject application. Such an ignition system is readily adaptable for using an electronic control circuit to control the control winding of the ignition system, and this aspect is clearly described in the foregoing patents. The details of such an electronic control circuit per se are described in a U.S. Pat. No. 3,861,369, which is also assigned to the same assignee as this application.

This invention also makes use of a photoelectric type of control element at the distributor. It is used to replace the conventional breaker point arrangement of other more conventional type of ignition systems, and such a photo electric distributor system is described in U.S. Pat. No 3,792,261 which is also assigned to the common assignee of the aforementioned patents and this application.

It may be noted that while an electronic ignition system in accordance with the foregoing patents may be controlled by breaker-point switching of the input control signal, it is preferred to employ a photoelectric distributor in order to gain the benefits thereof.

This invention concerns the use of a dual control arrangement at the distributor, such that there are individual timing control signals provided that have different crank angle settings, so that one or the other may be selected as desired. This is done in order to shift the basic timing of ignition signals from one to the other, e.g. from a dead center position to a retarded spark position for special engine loading conditions. While such concept per se is known from prior patents, the disclosures thereof have only been concerned with breaker point switches to act as the timing controls. With such systems, whenever the shift from one of the controls to the other is carried out, there is a considerable probability of the shift over happening in the middle of the alternate timing signals. And, such a shift over is quite adapt to create an interference caused by the change from one set of breaker points to the other. Consequently, a spark might well be missed. On the other hand this invention provides for overcoming such difficulties so that a shift over may take place during a sparking interval without disrupting the spark then being provided. Consequently, the shift over is made without any possible spark miss.

Figure 1:
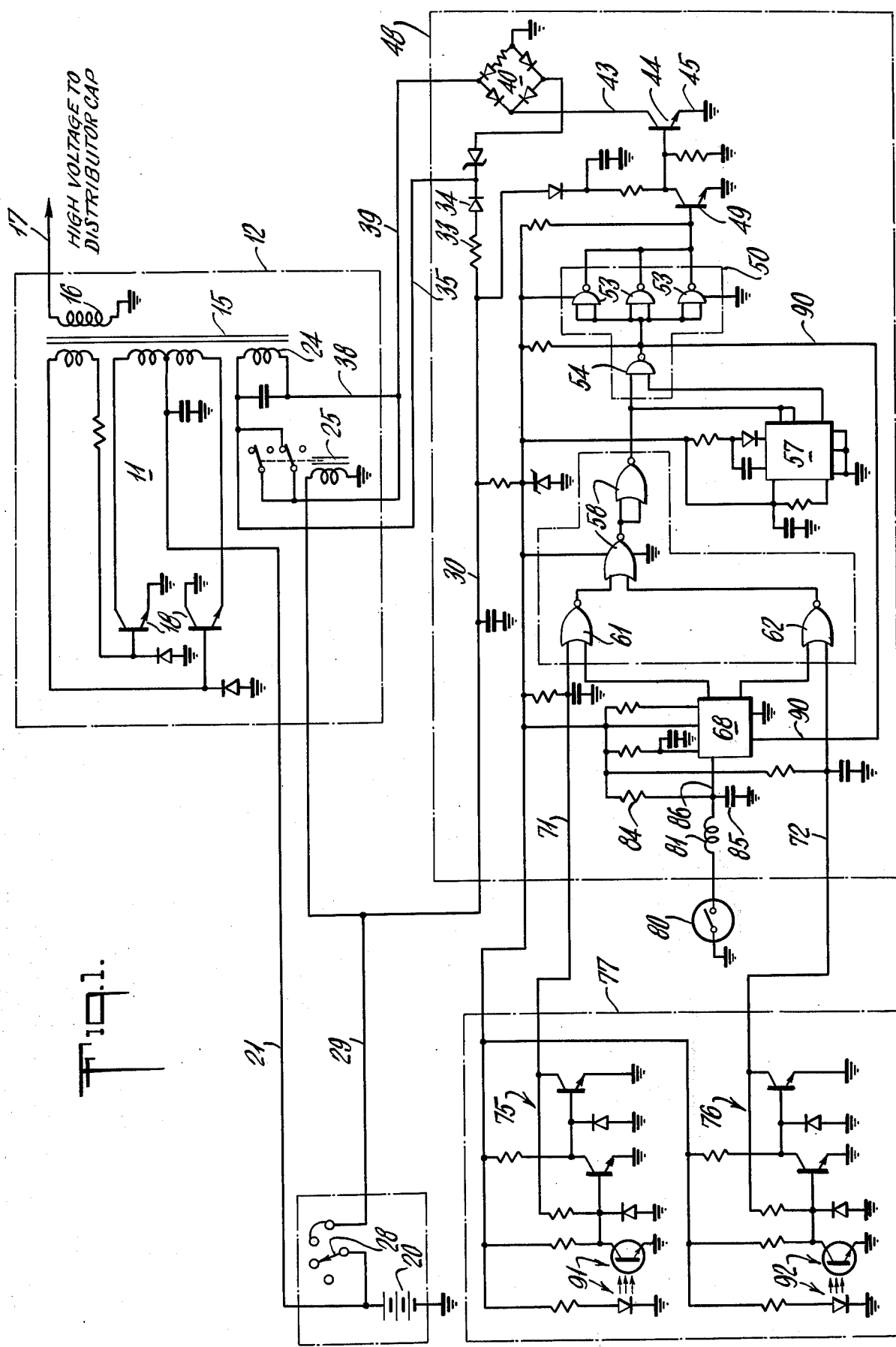
FIG. 1 is a schematic circuit diagram illustrating an ignition system according to the invention.

With reference to FIG. 1, it may be noted that the ignition system provides controlled spark-duration ignition. It includes a high frequency oscillator 11 which is part of a unit 12 shown enclosed in dash lines. This unit 12 is substantially like the corresponding portion of the ignition system shown in the aforementioned U.S. Pat. No. 3,818,885. The unit includes a transformer 15 that has a high voltage output winding 16 thereon. One end of winding 16 is connected to a circuit connection 17 that leads to the distributor cap, as indicated by the caption.

The oscillator 11 is a known type. It employs a pair of transistors 18, and it develops square wave AC signals in a manner which is adequately described in the aforementioned patent. Consequently, no further details are needed here. It may be noted that the power supply for the oscillator 11 is directly connected from a battery 20 to the oscillator via a permanent circuit connection 21.

Control of starting and stopping of the oscillator 11 is had by a control winding 24 on the transformer 15. And, this aspect also is described in the aforementioned patent. Loading of the control winding 24 prevents oscillation of the oscillator 11. While removal of the load along with a DC bias current, ensures positive starting of the oscillator 11 at the beginning of each spark signal duration. Also, it may be noted that there is provided a relay 25 that is controlled by an ignition switch 28, so that whenever the ignition switch is turned off the relay 25 will be deactived into the switch contacts position that is illustrated in FIG. 1. Consequently, there will be a direct short-circuit connection across the control winding 24. This makes sure that the oscillator 11 remains shut down whenever the engine is turned off.

Whenever the ignition switch 28 is turned on for providing spark signals to the internal combustion engine to which the ignition system applies, the relay 25 will be energized so as to remove the direct short circuit connection indicated above. This allows the ignition system to operate under the control of the timing units that are situated on the distributor of the engine. When the system is thus operating the starting and stopping of oscillator 11 is controlled by the control winding 24 in the manner indicated and described in the above patent. Briefly, it provides for having a bias current flow through the control winding 24 during the oscillator loading conditions, and the loading prevents oscillation of the oscillator 11. The DC bias current flows over a circuit which includes the ignition switch 28 and circuit connections 29 and 30 to a resistor 33 and a diode 34. It also includes a circuit connection 35 that goes to one end of the control winding 24. From the other end of winding 24, the bias current circuit is completed via circuit connections 38 and 39 that go to one corner of a diode bridge 40. An adjacent corner of the bridge 40 is connected via a connection 43 to one electrode of a transistor 44. The other current electrode is connected to ground via a circuit connection 45. And, the circuit is completed from ground to one side of the battery 20. The other side of the battery is, of course, connected to the ignition switch 28.

When the DC bias current circuit, just described, is opened by reason of having the transistor 44 go to its non-conducting state, the oscillator 11 is instantaneously and positively started, and it continues to oscillate until transistor 44 goes conducting once more. Thus, transistor 44 acts as an electronic switch means, which controls the duration of ignition signals that are delivered at the output circuit 17 from high voltage winding 16.

So, the transistor 44 acts as a switch for starting and stopping the oscillator 11 to provide the predetermined duration sparking signals, as indicated above. The transistor 44 is part of an electronic control unit 48 that is indicated in FIG. 1 by a dash line rectangle. This is basically similar in principle to the control circuit arrangement described in the above noted U.S. Pat. No. 3,861,369. Thus, there is another transistor 49 that controls the state of conduction or non-conduction of transistor 44. It in turn is controlled by the output of an integrated circuit 50 which is connected as three gates 53 in parallel, and a fourth gate 54 that has its output connected to the parallel inputs of gates 53. The gate 54 has one of its two inputs connected to a multivibrator unit 57 that is a retriggerable monostable multivibrator, as described in the aforementioned U.S. Pat. No. 3,861,369. This unit 57 acts to cut off an ignition signal after a predetermined time delay so that the engine will not have an ignition signal continue unchecked in the event that the engine should stall with an ignition signal called for. The integrated circuit 50 along with the transistor 49 may be considered as trigger means for switching the electronic switch means 44 from conducting to non-conducting state and back.

The engine timed control signals for initiating and determining spark time duration as each spark is called for, are transmitted by a pair of NOR gates 58 in series. The first of these gates 58 has two input circuits that are connected from the outputs of two additional NOR gates 61 and 62. All four of these gates, i.e. 58 (pair) and 61 and 62 may be part of an integrated circuit 65 that is indicated by a dashed line. Also, there is a flip-flop 68 that has two outputs one connected to an input of each of the gates 61 and 62. The arrangement is such that for each state of the flip-flop 68 one of the gates 61 or 62 will pass signals as received from the other of its inputs, but the other gate will not. The flip-flop 68 may be a commercially designated type 5474 integrated circuit.

It will be noted that there are two input circuit connections 71 and 72 one for each of the gates 61 and 62 respectively. These inputs circuits 71 and 72 lead from the outputs of two photoelectric sensor units 75 and 76 respectively. Each of these sensor units are substantially the same as one another and they are basically similar to the photoelectric sensor units described in the foregoing issued U.S. Pat. Nos. 3,792,261 and 3,861,369. The sensors of this invention, however, are both mounted on a single distributor 77 and located diametrically opposite one another.

It may be noted that both of the sensor units 75 and 76 are energized continuously whenever the ignition system is turned on. Consequently, there are engine timed signals simultaneously being generated, but with different crank angle degree settings. However, only one of these sensors at a time will be effectively connected to control the electronic switch transistor 44. This is because of the gates 61 and 62 along with the flip-flop 68 which controls them.

There is a switch 80 that is actuated in relation to the load conditions on the engine. It may be mechanically connected to the accelerator (not shown) of the engine. It provides a control signal input to the flip-flop 68 via an inductance 81. The other end of the inductance 81 from the switch 80 is connected between a resistor 84 and a capacitor 85. It also is connected to a control input connection 86 of the flip-flop 68. However, the flip-flop 68 does not change state upon receipt of the signal from switch 80 until a clocking pulse has been received thereafter. Such clocking pulse goes over a circuit connection 90 to the flip-flop 68. The clocking pulses that are carried over this circuit connection 90 originate from the output of the gate 54, and it is the trailing edge of the crank angle controlled ignition signals that act as the clocking signals to flip the flip-flop 68 whenever the basic ignition timing state is to be changed. Consequently, the shift from one sensor unit 75 or 76 to the other cannot take place in the middle of a spark ignition signal because it must wait for the ending thereof before the switch-over takes place. This means that there is not any possibility of a spark miss on account of the shift over from one sensor or crank angle controlled setting to the other.

Figure 2:
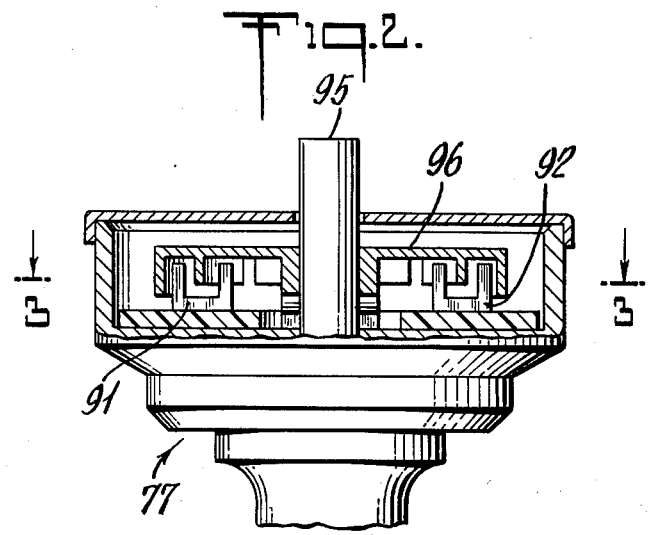
FIG. 2 is a partial elevation view partly broken away in cross section, illustrating a typical distributor that would be employed with a system according to the invention.
Figure 3:
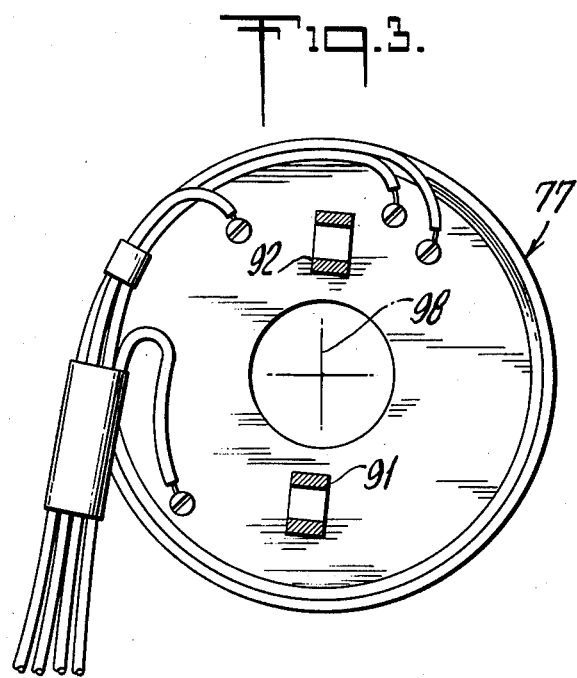
FIG. 3 is a plan view taken along the lines 3—3 of FIG. 2 but with the cover and timing shaft elements of the distributor removed.

FIGS. 2 and 3 illustrate the distributor 77 and indicate how the two sensors are situated on the structure thereof. As indicated by the U.S. Pat. No. 3,792,261, each sensor unit 75 and 76 (FIG. 1) includes a photoelectric pair of complementary elements 91 and 92 respectively, which have a light emitting diode beamed onto the light sensitive element of a silicon phototransistor.

The distributor 77 has a shaft 95 that is connected to the crank shaft of the engine in a positive manner, as is conventional with distributor structures. A shutter element 96 is keyed to the shaft 95 for positive rotation therewith, and the shutter 96 acts to control passage of a light beam between the photo-elements of the pairs 91 and 92 that are mounted on the stationary portion of the distributor 77. The operation is similar in principle to that shown and described in the U.s. Pat. No. 3,792,261 except that in this case there are two of the photoelectric pairs 91 and 92 instead of only one.

It will be noted that in this invention the photoelectric pairs 91 and 92 are mounted diametrically opposite one another as indicated in FIG. 3. They are placed with different timing angles relative to the angular position of the crank shaft, or timing shaft 95. This will be actually only a few degrees, but it is exaggerated for the purposes of illustration in the FIG. 3 showing. Thus, as indicated by a center line 98 in FIG. 3, the photoelectric pairs or sensor units 91 and 92 are not directly opposite one another but have a predetermined number of degrees of offset which is for the purpose of setting the timing from one basic timing condition to another, as desired.

Operation

An ignition system according to this invention makes use of duplicate ignition timing control sensor units e.g. sensors 75 and 76 indicated in FIG. 1. They each have a photoelectric pair 91 and 92 each made up of a light emitting diode and a light sensitive transistor, as described above. These units 75 and 76 are both activated when the ignition switch 28 is turned on, and the timing signals are therefore continuously created by both sensor units. However, the timing of each relative to the engine crank shaft positions, is set by the physical location of the photoelectric pairs 91 and 92 on the distributor unit. But, as will appear hereafter, only one of the two sensor units 75 and 76 will be effective to control the ignition spark signals as applied to the spark plugs of the engine.

Assuming that with the accelerator actuated switch 80 in the open position, i.e. as illustrated in FIG. 1, the sensor 75 will have its signals pass through gate 61 and on through the pair of gates 58 to an input of gate 54. Then the other sensor 76 will have its signals blocked at the gate 62. Therefore the timing signals from the sensor unit 75 will be effective in controlling the ignition timing, and the signals will continue through the gate 54 the output of which goes via the gates 53 to the control circuit for transistor 49 which in turn controls the switching transistor 44. As noted above, the transistor 44 determines the starting and stopping of the oscillator 11 by means of controlling current flow through the control winding 24.

It is the flip-flop 68 that determines which of the gates 61 or 62 will be blocked and cannot pass any signals. Consequently, so long as the flip-flop remains in the state indicated above, the control signals for providing ignition sparking signals is determined by the sensor 75. Now if the switch 80 should be closed it will provide a control pulse into flip-flop 68 via the input connection 86. This will set the flip-flop ready for changeover upon receipt of the next clocking pulse.

It will be noted that clocking pulses are introduced over the circuit connection 90. Consequently, whether a signal from the switch 80 comes before, or even in the middle of an ignition signal duration; it will not be until the ending of that ignition signal that the flip-flop 68 will be flipped over to its opposite state. This is because it is the trailing edge of ignition signal pulses passing through the gate 54, that act to clock the flipping over of the flip-flop 68.

Consequently, when the switch 80 is closed the timing signals from sensor 75 will not be lost, or cut out in the middle thereof. Rather, the switch-over to sensor unit 76 will not take place until the ending of a signal from unit 75.

It will be understood that it works similarly in the opposite situation. For example, should the switch 80 be changed back from its closed position to the open position again, the flip-flop 68 will once more be provided with a control pulse that will set it for flipping over but will not actually flip it until the clocking pulse signal is received. Such clocking pulse is at the trailing edge of each ignition timing control signal.

Thus, under the foregoing assumed conditions, after switch 80 has been closed the sensor unit 76 will be effectively connected and its signals will be controlling the timing of spark signals. But then when switch 80 is opened once more, the flip-flop will flip at the end of the next timing signal pulse and the gate 62 will then be blocked while gate 61 will be reopened.

It will be noted from the foregoing, that the use of dual timing sensor elements which permit the change of basic timing settings, becomes quite feasible and precludes any possible spark misses. This is a principal advantage of the electronic control system as shown in the foregoing description of this invention.

While a particular embodiment of the invention has been described above in considerable detail in accordance with the applicable statutes, this is not to be taken as in any way limiting the invention but merely as being descriptive thereof.

We claim:

1. In combination with a controlled-spark-duration ignition system for an interval combustion engine, said system having a high-frequency continuous-wave oscillator including a transformer having a high-voltage output winding adapted for connection to a sparking circuit, an oscillator control winding on said transformer for starting and stopping oscillation, and electronic switch means comprising a transistor connected in series with said oscillator control winding and trigger means for switching said transistor from conducting to non-conducting state and back, the improvement comprising a pair of photo electric sensors mounted diametrically apart on the distributor of said engine and having different ignition timing angles.relative to said engine crank shaft, a pair of electronic gates, an engine load condition activated switch, an electronic flip-flop for controlling which of said gates is open.

said sensors being each connected to one of said gates, means for connecting the output of said gates to said trigger means.

2. The invention according to claim 1, wherein said electronic switch means comprises a transistor connected in series with said oscillator control winding, and trigger means for switching said transistor from conducting to non-conducting state and back.

3. The invention according to claim 2, further including a clocking pulse circuit from said trigger means to said flip-flop for flipping said flip-flop on the return of said transistor to said conducting state if said engine load condition has changed.

4. In combination with a controlled-spark-duration ignition system for an interval combustion engine, said system having a high-frequency continuous-wave oscillator including a transformer having a high-voltage output winding adapted for connection to a sparking circuit, an oscillator control winding on said transformer for starting and stopping oscillation, and electronic switch means comprising a transistor connected in series with said oscillator control winding and trigger means for switching said transistor from conducting to non-conducting state and back, the improvement comprising a pair of photoelectric sensors mounted diametrically apart on the distributor of said engine and having different ignition timing angles relative to said engine crank shaft, a pair of electronic gates, an engine load condition activated switch actuated by the accelerator of said engine, an electronic flip-flop for controlling which of said gates is open, said sensors being each connected to one of said gates, means for connecting the output of said gates to said trigger means, and a clocking pulses circuit from said trigger means to said flip-flop for flipping said flip-flop to its opposite state upon the return of said transistor to said conducting state if said engine load condition switch has been shifted from one position to the other.

* * * * *